(12) United States Patent
Bapna et al.

(10) Patent No.: US 11,064,251 B1
(45) Date of Patent: Jul. 13, 2021

(54) SYSTEMS AND METHODS FOR EVALUATING PAGE CONTENT

(71) Applicant: Facebook, Inc., Menlo Park, CA (US)

(72) Inventors: Abhishek Bapna, Mountain View, CA (US); Shunpo Chang, Mountain View, CA (US); Alex Dahlen, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/293,490

(22) Filed: Mar. 5, 2019

(51) Int. Cl.
*H04N 21/442* (2011.01)
*H04N 21/466* (2011.01)
*H04N 21/4788* (2011.01)
*H04N 21/4402* (2011.01)

(52) U.S. Cl.
CPC ... *H04N 21/44204* (2013.01); *H04N 21/4402* (2013.01); *H04N 21/4662* (2013.01); *H04N 21/4668* (2013.01); *H04N 21/4788* (2013.01)

(58) Field of Classification Search
CPC ........... H04N 21/4404; H04N 21/4662; H04N 21/4788; H04N 21/4402; H04N 21/4668
See application file for complete search history.

(56) References Cited

U.S. PATENT DOCUMENTS

| | | | |
|---|---|---|---|
| 2011/0082849 A1* | 4/2011 | Rakowski | G06F 16/951 707/706 |
| 2016/0188600 A1* | 6/2016 | Owens | G06Q 30/02 707/734 |

* cited by examiner

*Primary Examiner* — Yassin Alata
(74) *Attorney, Agent, or Firm* — Sheppard Mullin Richter & Hampton LLP

(57) ABSTRACT

Systems, methods, and non-transitory computer-readable media can determine a page to be scored for quality based at least in part on videos posted in the page. Respective video ecosystem quality scores can be determined for the videos posted in the page. A video ecosystem quality score can be determined for the page based at least in part on the respective video ecosystem quality scores for the videos posted in the page.

20 Claims, 10 Drawing Sheets

SYSTEMS AND METHODS FOR EVALUATING PAGE CONTENT

FIELD OF THE INVENTION

The present technology relates to the field of networked communications. More particularly, the present technology relates to techniques for improving the quality of content presented to users in a computerized networking system.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others.

SUMMARY

Various embodiments of the present technology can include systems, methods, and non-transitory computer readable media configured to determine a page to be scored for quality based at least in part on videos posted in the page. Respective video ecosystem quality scores can be determined for the videos posted in the page. A video ecosystem quality score can be determined for the page based at least in part on the respective video ecosystem quality scores for the videos posted in the page.

In an embodiment, a video ecosystem quality score for a video is determined based on a combination of two or more sub-scores.

In an embodiment, the video ecosystem quality score for the video is determined based at least in part on a first sub-score that corresponds to a video quality panel score for the video, the video quality panel score measuring a quality of the video.

In an embodiment, the video quality panel score is predicted based on a machine learning model that is trained to output the video quality panel score for the video based on a set of features describing the video and the page.

In an embodiment, the video ecosystem quality score for the video is determined based at least in part on a second sub-score that corresponds to a high-intent score for the page, the high-intent score measuring an amount of user intent demonstrated when accessing the page.

In an embodiment, the high-intent score is determined based at least in part on a loyalty score that measures an amount of user loyalty toward the page and an intentionality score that measures an amount of user intentionality toward the page.

In an embodiment, the video ecosystem quality score for the video is determined based at least in part on a third sub-score that corresponds to an integrity score for the video, the integrity score being based on a set of factors for evaluating subject matter represented in the video.

In an embodiment, the video ecosystem quality score for the page is determined based on an average of the video ecosystem quality scores for the videos posted in the page.

In an embodiment, the systems, methods, and non-transitory computer readable media are configured to categorize the page based at least in part on the video ecosystem quality score for the video.

In an embodiment, the systems, methods, and non-transitory computer readable media are configured to provide the page as a recommendation to one or more users based at least in part on the video ecosystem quality score for the page.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
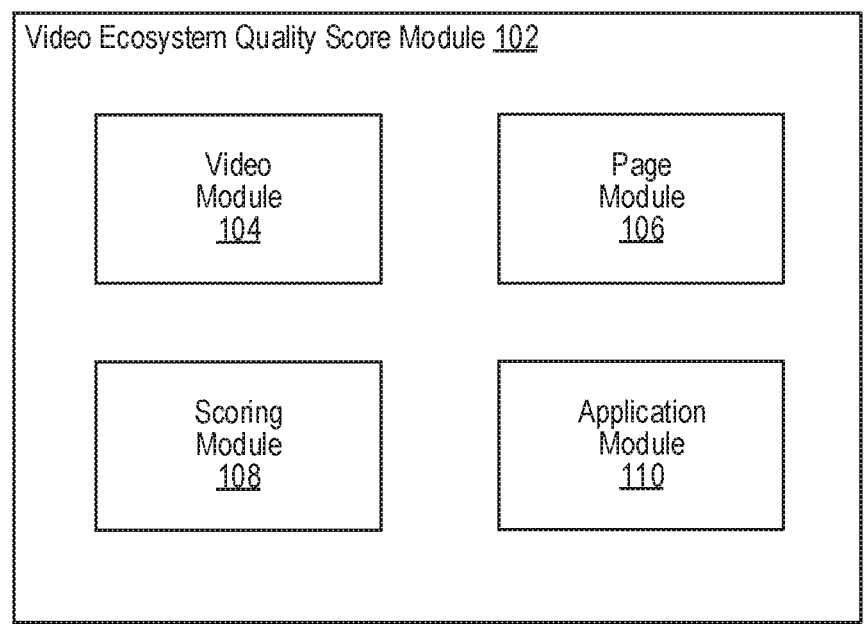
FIG. 1 illustrates an example system including an example video ecosystem quality score module, according to an embodiment of the present technology.
Figure 1:
Figure 1:
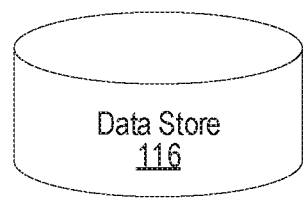

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Evaluating Page Content

Under conventional approaches, users can access various content through a content provider (e.g., a social networking system). Typically, a user operating a computing device can interact with the content provider over one or more computer networks. Further, the accessed content can be presented through a display screen by a software application (e.g., a web browser, social networking application, etc.) running on the computing device. Such conventional approaches permit users to conveniently access various types of content. For example, an entity (e.g., page administrator, owner, etc.) may create and publish a page through the content provider. Users can access the page to view various information including content posted in the page (e.g., images, videos, etc.). Conventional approaches for determining a level of quality associated with a page are limited. For example, conventional approaches may determine a level of quality associated with a page based on a count of users that have subscribed to the page or how frequently the page is accessed. However, such conventional approaches can lead to inaccurate conclusions, since they fail to consider other indicia of quality. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, video ecosystem quality scores can be determined for pages. A video ecosystem quality score for a page can provide a numerical score that corresponds to a level of quality associated with the page. In various embodiments, the video ecosystem quality score for the page can be determined based on a combination of respective video ecosystem quality scores for videos posted in the page. In some embodiments, a video ecosystem quality score for a video can be determined based on a combination of sub-scores. For example, the sub-scores can include a first sub-score that measures video quality, a second sub-score that measures user intent towards the page, and a third sub-score that measures an integrity of the video. In various embodiments, video ecosystem quality scores for pages can be used to categorize pages based on quality. As a result, pages including videos having high production value can be grouped in the same category while pages including videos having low production value can be grouped in a separate category. The categorized pages can be used for myriad applications. For example, in some embodiments, pages included in a high quality category can be provided as recommendations to users. More details relating to the present technology are provided below.

FIG. 1 illustrates an example system 100 including an example video ecosystem quality score module 102, according to an embodiment of the present technology. In some embodiments, the video ecosystem quality score module 102 can be configured to determine video ecosystem quality (VEQ) scores for videos and pages accessible through a content provider (e.g., a social networking system such as the social networking system 630 of FIG. 6). As shown in the example of FIG. 1, the video ecosystem quality score module 102 can include a video module 104, a page module 106, a scoring module 108, and an application module 110. In some instances, the example system 100 can include at least one data store 116. The components (e.g., modules, elements, etc.) shown in this figure and all figures herein are exemplary only, and other implementations may include additional, fewer, integrated, or different components. Some components may not be shown so as not to obscure relevant details.

In some embodiments, the video ecosystem quality score module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video ecosystem quality score module 102 or at least a portion thereof can be implemented using one or more computing devices or systems that include one or more servers, such as network servers or cloud servers. In some instances, the video ecosystem quality score module 102 can, in part or in whole, be implemented within or configured to operate in conjunction with a social networking system (or service), such as the social networking system 630 of FIG. 6. In some instances, the video ecosystem quality score module 102 can be, in part or in whole, implemented within or configured to operate in conjunction or be integrated with a client computing device, such as the user device 610 of FIG. 6. For example, the video ecosystem quality score module 102 can be implemented as or within a dedicated application (e.g., app), a program, or an applet running on a user computing device or client computing system. The application incorporating or implementing instructions for performing some, or all, functionality of the video ecosystem quality score module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The video ecosystem quality score module 102 can be configured to communicate and/or operate with the at least one data store 116, as shown in the example system 100. The at least one data store 116 can be configured to store and maintain various types of data used by the video ecosystem quality score module 102. In some embodiments, the data store 116 can store information describing users, pages, and various content (e.g., video content) associated with pages. In some implementations, the at least one data store 116 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 116 can store information associated with users, such as user identifiers, user information, profile information, user specified settings, content produced or posted by users, and various other types of user data.

The video module 104 can be configured to determine videos to be scored for quality. For example, the video module 104 can receive information identifying a video that was published through a content provider (e.g., a social networking system, such as the social networking system 630 of FIG. 6). The video module 104 can then provide this information to the scoring module 108 which can generate a video ecosystem quality score for the video. This score can be used in myriad ways, as described below in reference to the application module 110.

The page module 106 can be configured to determine pages to be scored for quality. For example, the page module 106 can receive information identifying a page that is accessible through the social networking system. For example, the page may relate to a particular topic or entity (e.g., business, organization, person, etc.). In general, the page can publish various types of content including posts, images, and videos, to name some examples. The page module 106 can determine videos that were published (or shared) through the page by users (e.g., page administrators). In some embodiments, the page module 106 can identify videos that were posted in the page within some pre-defined timeframe. For example, the page module 106 can identify videos posted in the page within the past week, past month, or past year. The page module 106 can provide information describing each video to the scoring module 108 to determine a respective video ecosystem quality score for each video. In various embodiments, a video ecosystem quality score for the page can be determined based on an average of the respective video ecosystem quality scores of the videos posted in the page.

The scoring module 108 can be configured to generate video ecosystem quality scores for videos. In various embodiments, a video ecosystem quality score for a video can be determined based on a combination of sub-scores. For example, the video ecosystem quality score for the video can be based on two or more of the following sub-scores: (1) a video quality panel (VQP) score determined for the video, (2) a high-intent score determined for the video, and (3) an integrity score determined for the video. More details regarding the scoring module 108 will be provided below with reference to FIG. 2A.

The application module 110 can be configured to utilize video ecosystem quality scores for various purposes. For example, in some embodiments, videos can be ranked for potential presentation to users based on their respective video ecosystem quality scores. In some embodiments, videos can be provided as recommendations to users based on their respective video ecosystem quality scores. In various embodiments, video ecosystem system quality scores can be determined for pages, as described above. In some embodiments, pages can be ranked and recommended to users based on their respective video ecosystem quality scores. In some embodiments, pages can be categorized based on their respective video ecosystem quality scores. For example, pages having scores within a first numerical range can be categorized in a low quality category (or bucket), videos having scores within a second numerical range can be categorized in a medium quality category, and videos having scores within a third numerical range can be categorized in a high quality category. Many variations are possible.

Figure 2A:
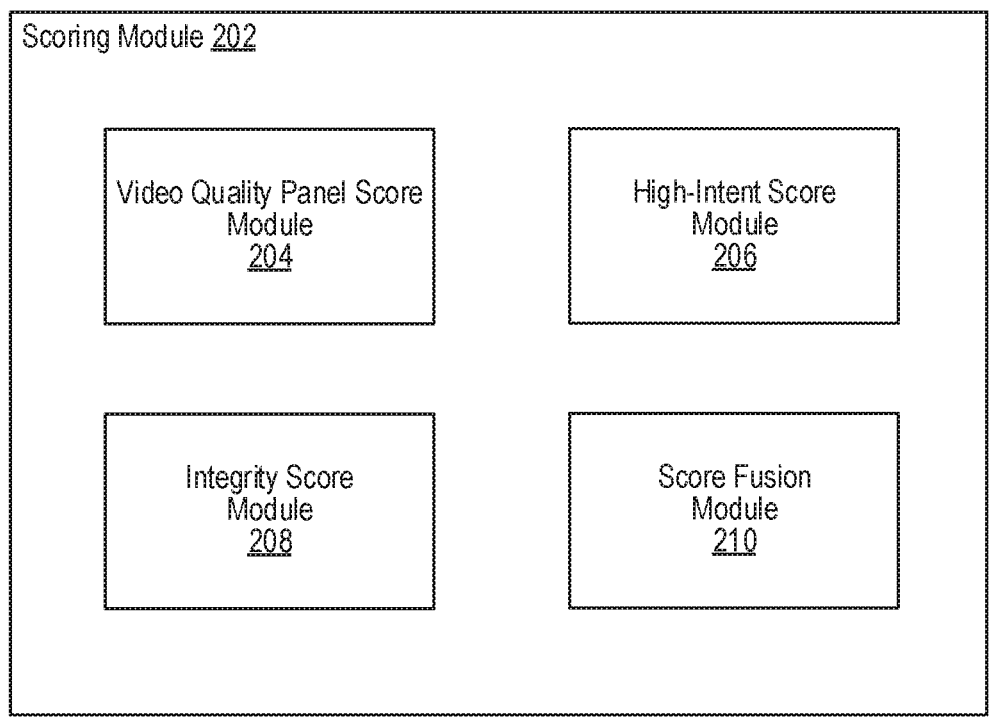
FIG. 2A illustrates an example scoring module, according to an embodiment of the present technology.

FIG. 2A illustrates a scoring module 202, according to an embodiment of the present technology. In some embodiments, the scoring module 108 of FIG. 1 can be implemented with the scoring module 202. As shown in the example of FIG. 2A, the scoring module 202 can include a video quality panel score module 204, a high-intent score module 206, an integrity score module 208, and a score fusion module 210. The scoring module 202 can generate video ecosystem quality scores for videos. In various embodiments, a video ecosystem quality score for a video can be determined based on a combination of sub-scores. For example, the video quality panel score module 204 can generate a first sub-score, the high-intent score module 206 can generate a second sub-score, and the integrity score module 208 can generate a third sub-score. The score fusion module 210 can be configured to combine the sub-scores to generate the video ecosystem quality score for the video.

The video quality panel score module 204 can be configured to generate a video quality panel sub-score for a video being scored. In various embodiments, the video quality panel score module 204 can determine the video quality panel sub-score based on a set of features corresponding to the video and a page in which the video was posted. More details regarding the video quality panel score module 204 will be provided below with reference to FIG. 2B.

The high-intent score module 206 can be configured to generate a high-intent sub-score for the page in which the video was posted. In various embodiments, the high-intent score module 206 can determine the high-intent sub-score based on a loyalty score and an intentionality score for the page. More details regarding the high-intent score module 206 will be provided below with reference to FIG. 2C.

The integrity score module 208 can be configured to generate an integrity sub-score for the video. In various embodiments, the integrity score module 208 can determine the integrity sub-score based on a set of factors for evaluating subject matter represented in the video. For example, the set of factors can include a first factor for determining whether the video is click bait, a second factor for determining whether the video contains pornography, a third factor for determining whether the video contains spam, and a fourth factor for determining whether the video contains hate speech, to name some examples. In various embodiments, the integrity score for the video can be determined and provided by the social networking system. For example, the social networking system can apply a tapered function to generate a numerical value between 0 and 1 for each of the factors where a higher score indicates a higher level of integrity. The integrity score for the video can be determined based on the respective numerical values generated for the factors. For example, in some embodiments, the integrity score can be determined by multiplying the respective numerical values generated for the factors. Many variations are possible.

The score fusion module 210 can be configured to generate a video ecosystem quality score for the video. In various embodiments, the video ecosystem quality score for the video can be determined based on a combination of the video quality panel sub-score, the high-intent sub-score, and the integrity sub-score. In some embodiments, the video ecosystem quality score can be determined as follows:

$$VEQ = VQP * (1 + \log_2(0.5 + \text{Intent})) * \text{Integrity},$$

where VEQ is the video ecosystem quality score for the video, where VQP is the video quality panel sub-score, where Intent is the high-intent sub-score, and where Integrity is the integrity sub-score. Naturally, many variations are possible. For example, in some embodiments, the video ecosystem quality score can be determined by applying different operations e.g., summation) to the video quality panel sub-score, high-intent sub-score, and the integrity sub-score. For example, the video ecosystem quality score can be determined by applying summation to the video quality panel sub-score, high-intent sub-score, and the integrity sub-score. In some embodiments, the video ecosystem quality score can be determined differently depending on a category associated with the video. For example, in some embodiments, if the video corresponds to news content, then the video ecosystem quality score for the video can be determined as follows:

$$VEQ = VQP * \text{Integrity},$$

where VEQ is the video ecosystem quality score for the video, where VQP is the video quality panel sub-score, and where Integrity is the integrity sub-score. Again, many variations are possible.

Figure 2B:
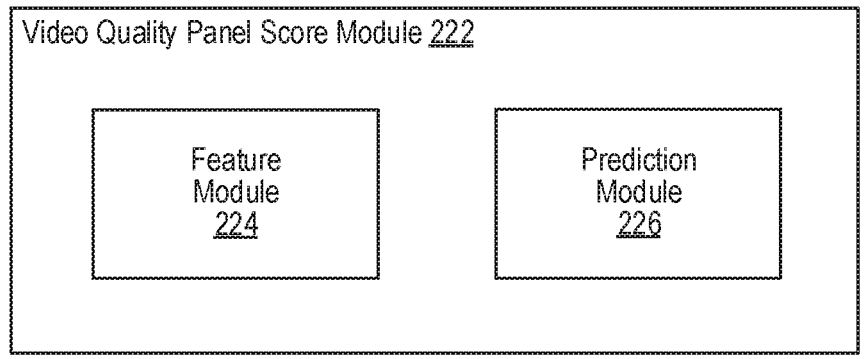
FIG. 2B illustrates an example video quality panel score module, according to an embodiment of the present technology.

FIG. 2B illustrates a video quality panel score module 222, according to an embodiment of the present technology. In some embodiments, the video quality panel score module 204 of FIG. 2A can be implemented with the video quality panel score module 222. As shown in the example of FIG. 2B, the video quality panel score module 222 can include a feature module 224 and a prediction module 226.

The feature module 224 can obtain a set of features for scoring a video. The set of features can include features describing the video to be scored and features describing a page in which the video was posted. In some embodiments, the set of features can be provided to a machine learning model which is trained to output a video quality panel score for the video. In general, videos can be posted in a page by a page administrator. The page may relate to a particular topic or entity (e.g., business, organization, person, etc.). Users can access the page through the social networking system. Further, users can follow (or subscribe to) the page to become a "fan" of the page. By being a "fan", the user can be provided updated content published in the page, for example, in a content feed provided by the social networking system. In some embodiments, the set of features can include a first feature corresponding to a retention score that measures user retention associated with the page in which the video was posted. For example, the retention score for the video can be determined based on a fraction of users that viewed the video and are expected to access another video posted in the same page within some timeframe. In some embodiments, the retention score can be determined as follows:

$$R = \frac{r}{t}$$

where R is the retention score for the video, where r is the number of users that viewed the video and are expected to view another video posted to the same page within some pre-defined timeframe (e.g., the next day, following week, etc.), and where t is the total number of users that viewed the video from the page. In some embodiments, the set of features can include a second feature corresponding to a length (or duration) of the video. In general, users tend to prefer videos with a storyline. As a result, videos that are shorter than 15 seconds in length can be perceived by users as being lower in quality. In some embodiments, the set of features can include a third feature corresponding to a visual quality metric for the video. The visual quality metric can be determined based on a combination of a bitrate and resolution corresponding to the video. For example, the video quality metric can be an integer between 0 and 100 where a video quality metric of 0 indicates the video has a low bitrate and resolution and a video quality metric of 100 indicates the video has a high bitrate and resolution. In general, videos having a high bitrate and resolution can be perceived by users as being high in quality. In some embodiments, the video quality metric can be determined and provided by the social networking system. In some embodiments, the set of features can include a fourth feature corresponding to a reshare metric. For example, the reshare metric for the video can be determined based on a fraction of users that viewed the video in its entirety and then shared the video with other users of the social networking system. In some embodiments, the reshare metric can be determined as follows:

$$M = \frac{e}{t}$$

where M is the reshare metric for the video, where e is the number of users that viewed the video in its entirety and shared the video, and where t is the total number of shares of the video by users. In some embodiments, the set of features can include a fifth feature corresponding to a motion score for the page in which the video was posted. The motion score can measure an amount of motion associated with videos included in the page to which the video being scored was posted. The motion score can be numerical value between 0 and 100 where a motion score of 0 indicates that videos in the page correspond to still-image videos (e.g., a video composed of a single image that is shown for some period of time) and a motion score of 100 indicates that videos in the page correspond to moving visual media (e.g., a video composed of multiple frames that are replayed). In some embodiments, the motion score for the page can be determined and provided by the social networking system.

In some embodiments, the set of features can include a sixth feature corresponding to a reaction metric that is determined based on a number of user reactions received for the video. In general, users of the social networking system can interact with posted content by selecting options. These options can include an option to "like" the content and options for reacting to the content (e.g., a happy reaction, a sad reaction, an angry reaction, etc.). For example, the reaction metric for the video can be determined based on a fraction of users that selected an option to react to the video. In some embodiments, the reaction metric can be determined as follows:

$$R = \frac{r}{t}$$

where R is the reaction metric for the video, where r is the number of users that reacted to the video by selecting a reaction option (e.g., happy, sad, angry, etc.), and where t is the total number of likes and reactions received for the video by users.

The prediction module 226 can be configured to determine the video quality panel score for the video. As mentioned, in various embodiments, the prediction module 226 can determine the video quality panel score for the video based on a machine learning model. For example, the prediction module 226 can provide the set of features determined by the feature module 224 as input to the machine learning model. The machine learning model can then output the video quality panel score for the video based on the inputted set of features corresponding to the video. In some embodiments, the machine learning model can be implemented as a linear regression model. In various embodiments, the machine learning model can be trained to predict video quality panel scores for videos based on a set of training examples. Each training example can reference a video that was labeled by a plurality of human raters. For example, a labeled training example can indicate whether a given video was perceived as being high in quality by the plurality of human raters across various axes. The labeled training example can also include a set of features corresponding to the video. For example, the set of features can include a retention score for a page in which the video was posted, a length of the video, a visual quality metric for the video, a reshare metric for the video, a motion score for the page in which the video was posted, and a reaction metric for the video, as described above.

Figure 2C:
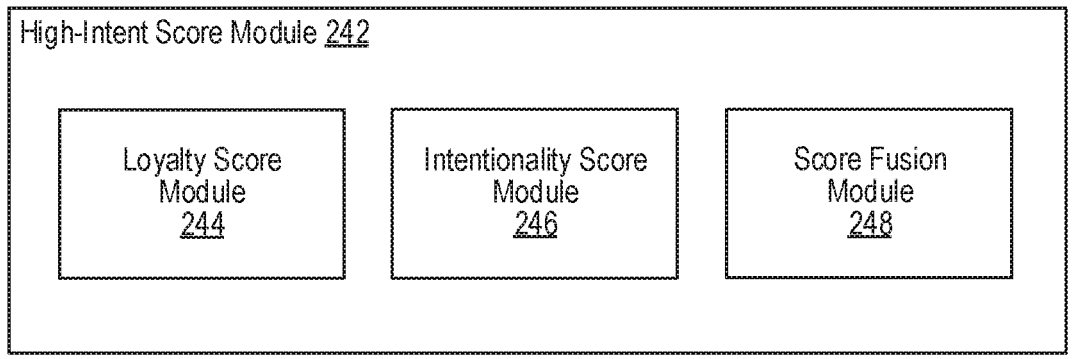
FIG. 2C illustrates an example high-intent score module, according to an embodiment of the present technology.

FIG. 2C illustrates a high-intent score module 242, according to an embodiment of the present technology. In some embodiments, the high-intent score module 206 of FIG. 2A can be implemented with the high-intent score module 242. As shown in the example of FIG. 2C, the high-intent score module 242 can include a loyalty score module 244, an intentionality score module 246, and a score fusion module 248.

The loyalty score module 244 can determine a loyalty score for a page in which a video being scored is posted. For example, the loyalty score can measure an amount of user loyalty toward the page. In some embodiments, the loyalty score can be determined based on a number of users that regularly access a particular tab in the page (e.g., a "watch tab"). For example, users may access the watch tab to view videos posted in the page. The watch tab can be an off-feed source of content for which notifications to users are not sent. In some embodiments, the loyalty score can be determined as follows:

$$L = \frac{w}{t}$$

where L is the loyalty score for the page, where w is the number of users that accessed the watch tab for at least a pre-defined period of time per day, and where t is the total number of users that accessed the page.

The intentionality score module 246 can determine an intentionality score for the page in which the video being scored is posted. For example, the intentionality score can measure an amount of user intentionality toward the page. In some embodiments, the intentionality score can be determined based on a number of users that accessed the page from a search result provided in response to a search query. For example, users that view the page after searching for particular videos can demonstrate an intentional effort to view the page. For example, in some embodiments, the intentionality score can be determined as follows:

$$I = \frac{s}{t}$$

where I is the intentionality score for the page, where s is the number of users that accessed the page from a search result provided in response to a search query, and where t is the total number of users that accessed the page.

The score fusion module 248 can combine the loyalty score and the intentionality score for the page to determine the high-intent score for the page. In some embodiments, the high-intent score for the page can be determined as follows:

$$H = w*\text{loyalty}*\text{intentionality}$$

where w is a pre-defined weight value (e.g., 500, 1000, 1500, 2500, etc.), where loyalty is the loyalty score for the page, and where intentionality is the intentionality score for the page.

Figure 3A:
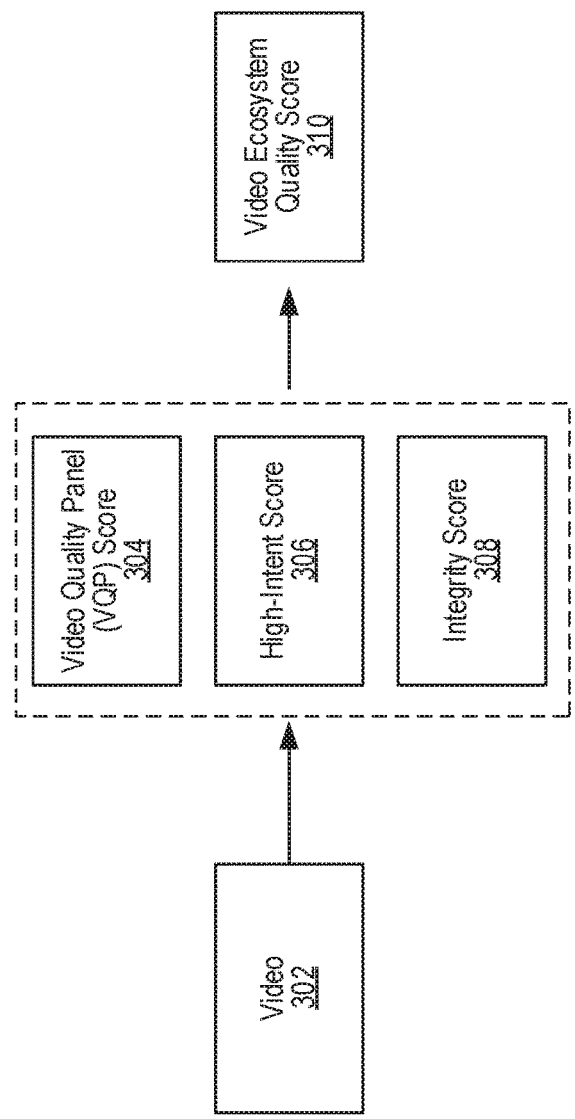
FIG. 3A illustrates an example functional block diagram, according to an embodiment of the present technology.

FIG. 3A illustrates an example functional block diagram 300 for determining a video ecosystem quality score for a video, according to an embodiment of the present technology. The functional block diagram 300 describes operations that can be performed by the video ecosystem quality score module 102. For example, at block 302, a video to be scored can be determined. At block 304, a video quality panel score can be determined, as described above in reference to the video quality panel score module 204. At block 306, a high-intent score can be determined, as described above in reference to the high-intent score module 206. At block 308, an integrity score can be determined, as described above in reference to the integrity score module 208. At block 310, the video quality panel score, the high-intent score, and the integrity score can be fused (or combined) to generate the video ecosystem quality score for the video, as described above in reference to the score fusion module 210. Many variations are possible.

Figure 3B:
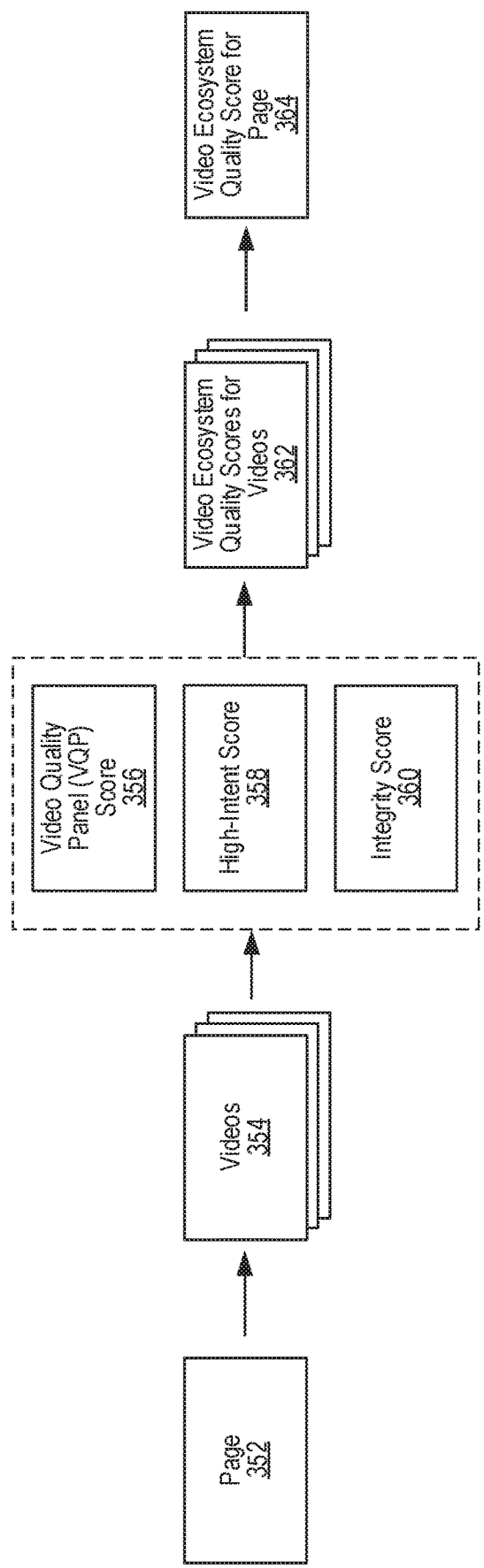
FIG. 3B illustrates another example functional block diagram, according to an embodiment of the present technology.

FIG. 3B illustrates an example functional block diagram 350 for determining a video ecosystem quality score for a page, according to an embodiment of the present technology. The functional block diagram 350 describes operations that can be performed by the video ecosystem quality score module 102. For example, at block 352, a video to be scored can be determined. At block 354, videos posted in the page can be scored. In some embodiments, only videos posted in the page within a pre-defined timeframe are scored. For example, only videos posted in the page within the past two weeks can be used to determine the video ecosystem quality score for the page. At block 356, a video quality panel score can be determined for each video, as described above in reference to the video quality panel score module 204. At block 358, a high-intent score can be determined for each video, as described above in reference to the high-intent score module 206. At block 360, an integrity score can be determined for each video, as described above in reference to the integrity score module 208. At block 362, a respective video ecosystem quality score can be determined for each video, as described above in reference to the score fusion module 210. At block 364, the video ecosystem quality score for the page can be determined. For example, in some embodiments, the video ecosystem quality score for the page can be determined based on an average of video ecosystem quality scores determined for the videos posted in the page. Many variations are possible.

Figure 4:
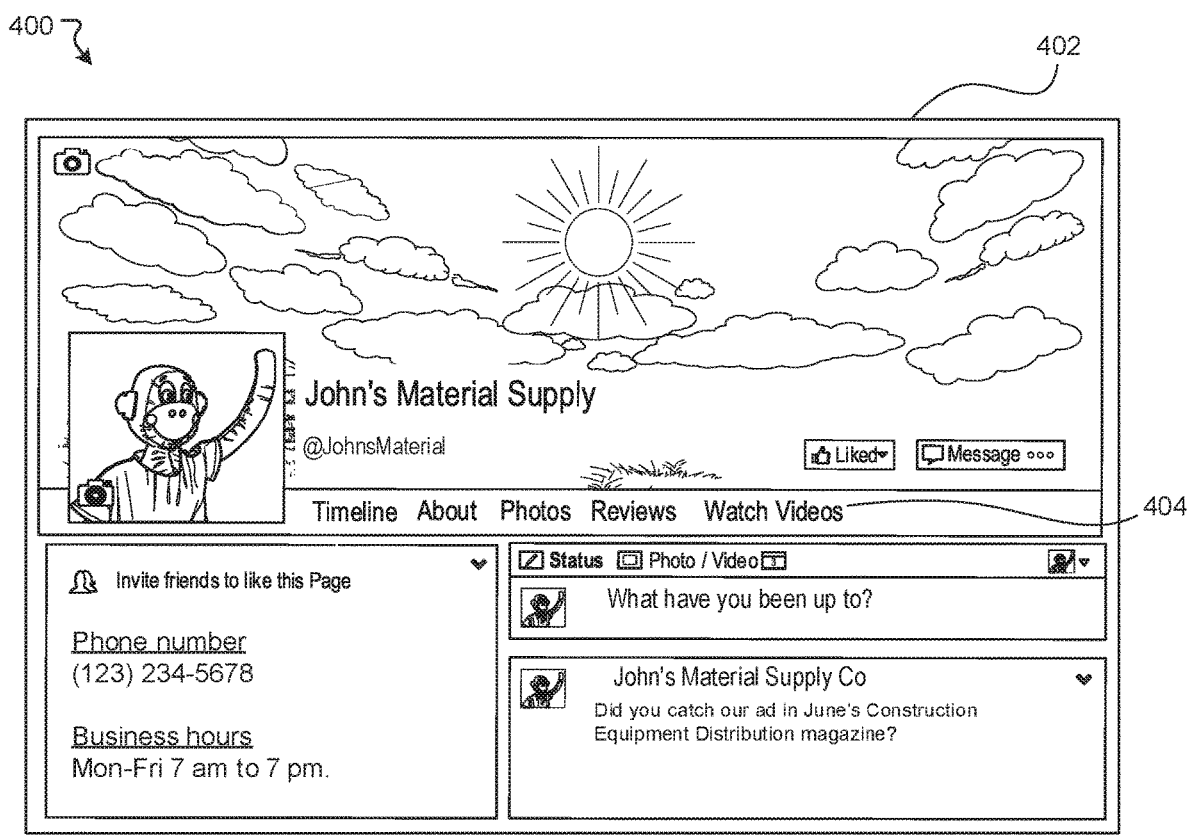
FIG. 4 illustrates an example page, according to an embodiment of the present technology.

FIG. 4 illustrates an example diagram 400 of a page 402, according to an embodiment of the present technology. The example page 402 may be presented on a display screen of a computing device. Further, the page 402 may be provided through an application (e.g., a social networking application) running on the computing device. The user operating the computing device can interact with the page 402 to access various information corresponding to a business ("John's Material Supply"). In some instances, users can access videos posted in the page 402. For example, the page 402 can include a tab 404 that can be accessed to view videos posted in the page 402. Many variations are possible.

Figure 5:
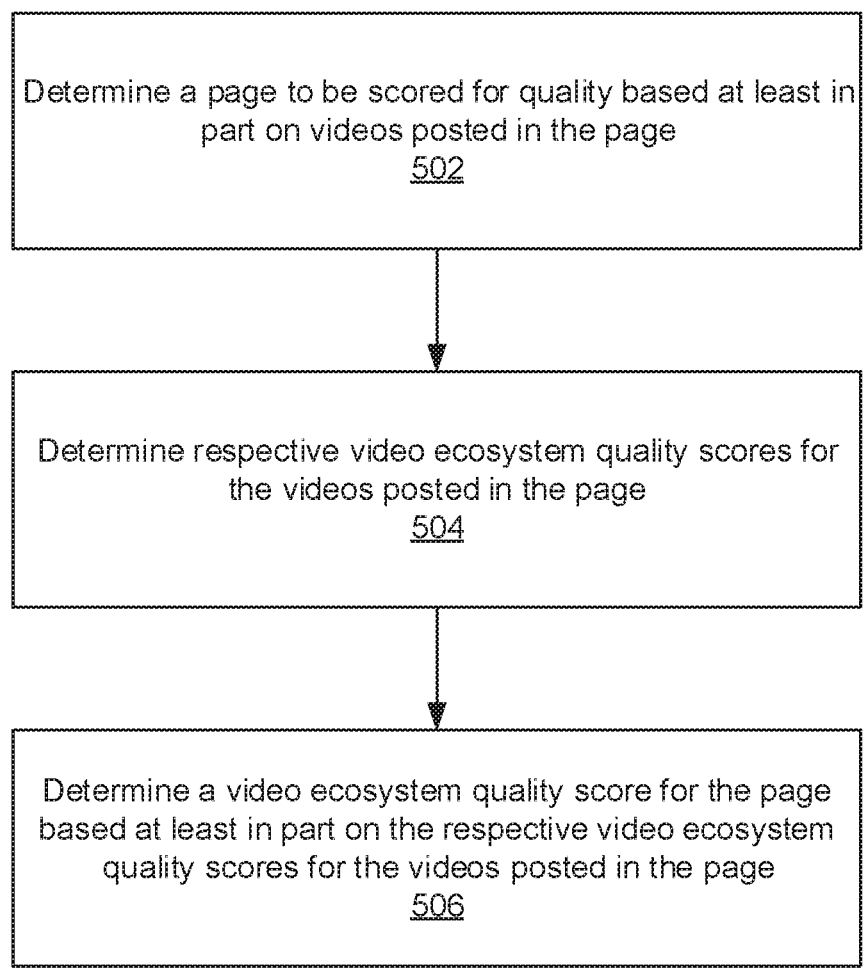
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, a page to be scored for quality based at least in part on videos posted in the page can be determined. At block 504, respective video ecosystem quality scores can be determined for the videos posted in the page. At block 506, a video ecosystem quality score can be determined for the page based at least in part on the respective video ecosystem quality scores for the videos posted in the page.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
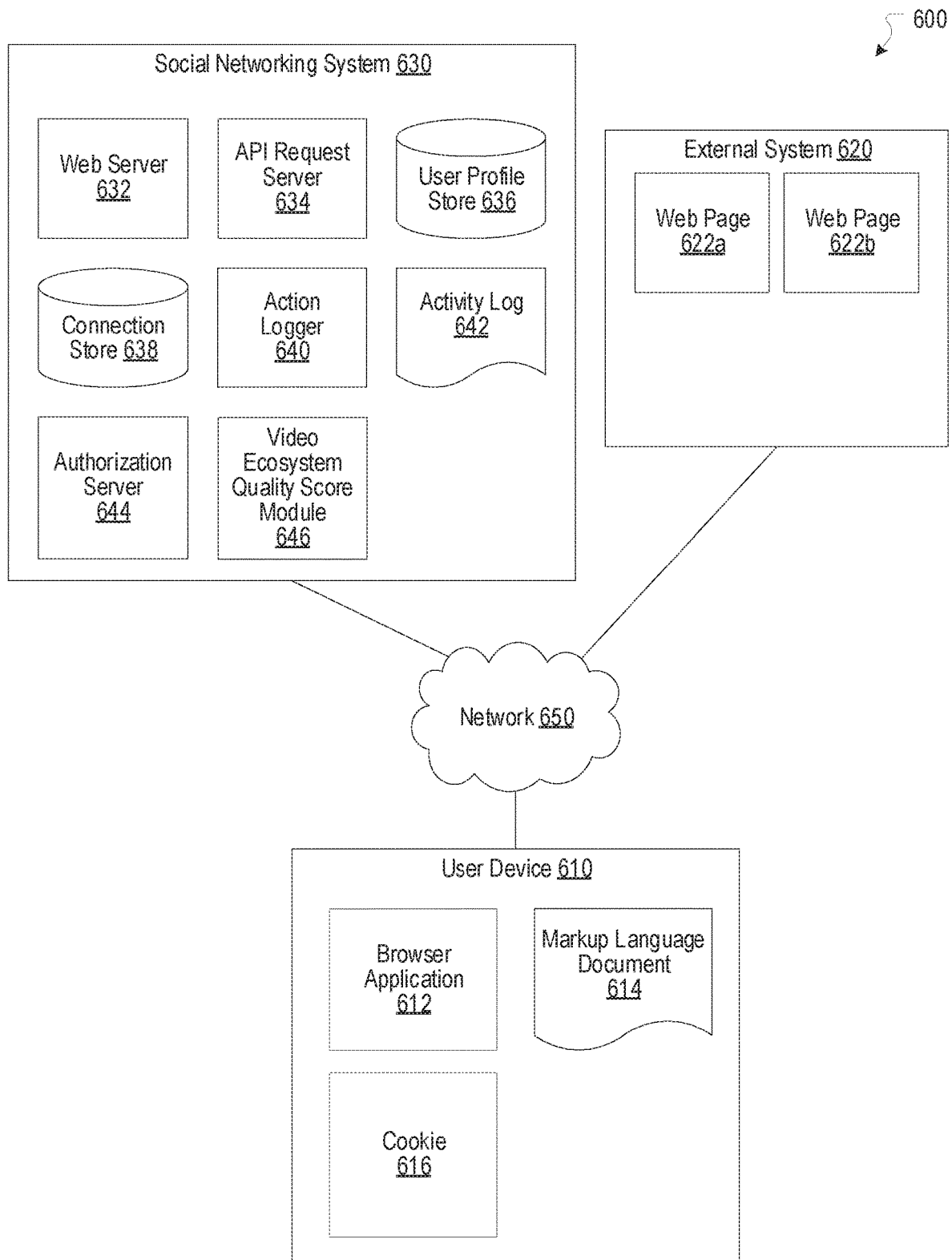
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a video ecosystem quality score module 646. The video ecosystem quality score module 646, for example, can be implemented as some or all of the functionality of the video ecosystem quality score module 102 of FIG. 1. As discussed previously, it should be appreciated that there can be many variations or other possibilities.

Hardware Implementation

Figure 7:
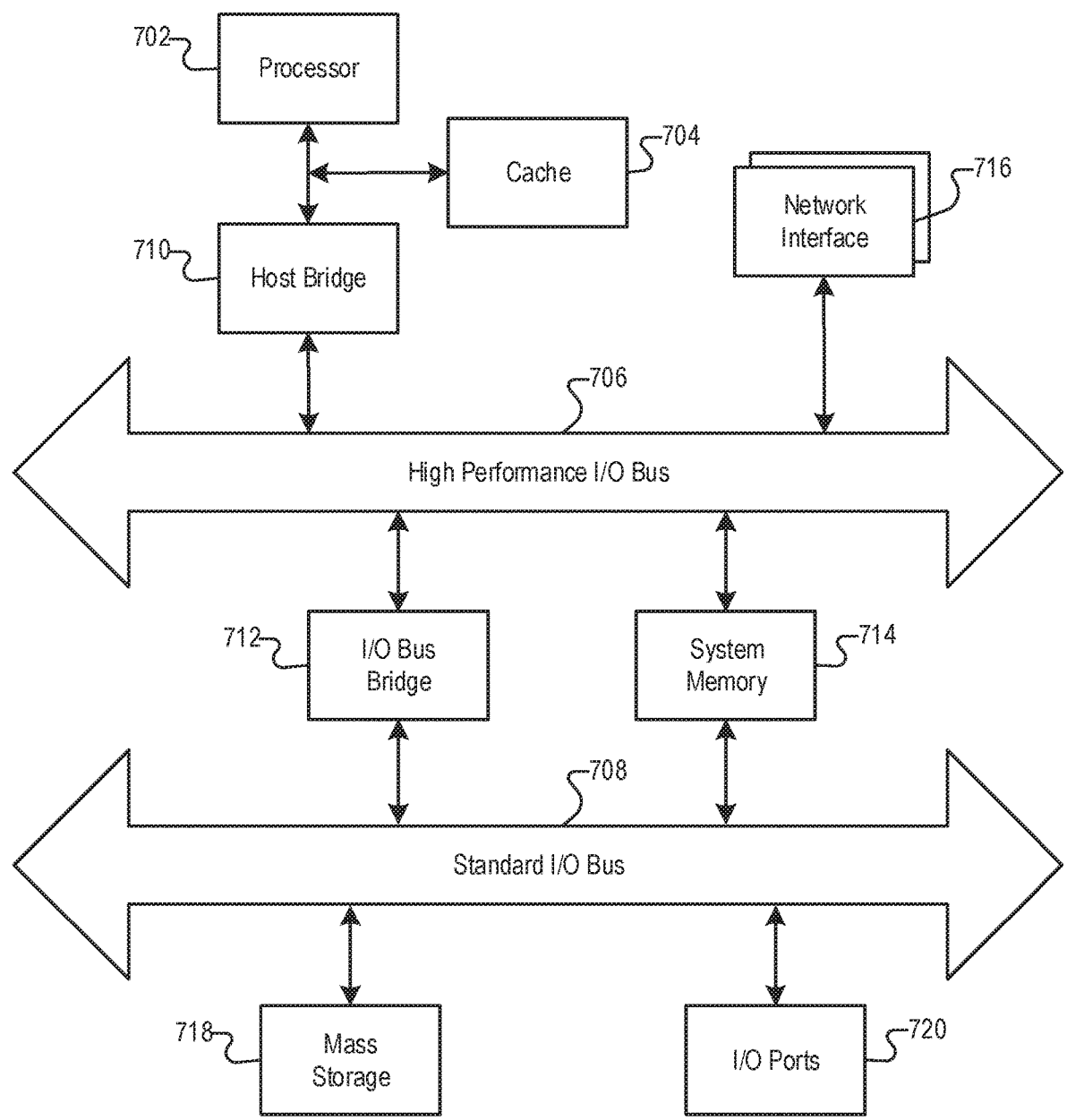
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown)

coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
determining, by a computing system, a page to be scored for quality based at least in part on videos posted in the page;
determining, by the computing system, respective video ecosystem quality scores for the videos posted in the page, the determining further comprising:
determining, by the computing system, a video quality panel score that measures a quality of a video posted in the page based at least in part on a machine learning model, wherein the machine learning model predicts the quality of the video based on a set of features associated with the video;
determining, by the computing system, a high-intent score that measures user loyalty for the page, wherein the high-intent score is based on user access to a watch tab associated with the page; and
determining, by the computing system, a video ecosystem quality score for the page based at least in part on (i) the respective video ecosystem quality scores for the videos posted in the page and (ii) the high-intent score for the page.

2. The computer-implemented method of claim 1, wherein the video ecosystem quality score for the video is determined based on a combination of the video quality panel score, the high-intent score, and one or more additional sub-scores.

3. The computer-implemented method of claim 2, wherein the set of features associated with the video include at least one of: a retention score, a length of the video, a video quality metric, or a reshare metric.

4. The computer-implemented method of claim 2, wherein the set of features associated with the video include a reaction metric for the video, wherein the reaction metric is determined based on a fraction of users that selected an option to react to the video.

5. The computer-implemented method of claim 2, wherein the high-intent score is determined based at least in part on a loyalty score that measures an amount of user loyalty toward the page.

6. The computer-implemented method of claim 5, wherein the high-intent score is determined based at least in part on an intentionality score that measures an amount of user intentionality toward the page.

7. The computer-implemented method of claim 2, wherein the video ecosystem quality score for the video is determined based at least in part on a third sub-score that corresponds to an integrity score for the video, wherein the integrity score is based on a set of factors for evaluating subject matter represented in the video.

8. The computer-implemented method of claim 1, wherein the video ecosystem quality score for the page is determined based on an average of the video ecosystem quality scores for the videos posted in the page.

9. The computer-implemented method of claim 1, further comprising:
categorizing, by the computing system, the page based at least in part on the video ecosystem quality score for the video.

10. The computer-implemented method of claim 1, further comprising:
providing, by the computing system, the page as a recommendation to one or more users based at least in part on the video ecosystem quality score for the page.

11. A system comprising:
at least one processor; and
a memory storing instructions that, when executed by the at least one processor, cause the system to perform:
determining a page to be scored for quality based at least in part on videos posted in the page;
determining respective video ecosystem quality scores for the videos posted in the page, the determining further comprising:
determining a video quality panel score that measures a quality of a video posted in the page based at least in part on a machine learning model, wherein the machine learning model predicts the quality of the video based on a set of features associated with the video;
determining a high-intent score that measures user loyalty for the page, wherein the high-intent score is based on user access to a watch tab associated with the page; and
determining a video ecosystem quality score for the page based at least in part on (i) the respective video ecosystem quality scores for the videos posted in the page and (ii) the high-intent score for the page.

12. The system of claim 11, wherein the video ecosystem quality score for the video is determined based on a combination of the video quality panel score, the high-intent score, and one or more additional sub-scores.

13. The system of claim 12, wherein the set of features associated with the video include at least one of: a retention score, a length of the video, a video quality metric, or a reshare metric.

14. The system of claim 12, wherein the set of features associated with the video include a reaction metric for the video, wherein the reaction metric is determined based on a fraction of users that selected an option to react to the video.

15. The system of claim 12, wherein the high-intent score is determined based at least in part on a loyalty score that measures an amount of user loyalty toward the page.

16. A non-transitory computer-readable storage medium including instructions that, when executed by at least one processor of a computing system, cause the computing system to perform a method comprising:
determining a page to be scored for quality based at least in part on videos posted in the page;
determining respective video ecosystem quality scores for the videos posted in the page, the determining further comprising:
determining a video quality panel score that measures a quality of a video posted in the page based at least in part on a machine learning model, wherein the machine learning model predicts the quality of the video based on a set of features associated with the video;
determining a high-intent score that measures user loyalty for the page, wherein the high-intent score is based on user access to a watch tab associated with the page; and
determining a video ecosystem quality score for the page based at least in part on (i) the respective video ecosystem quality scores for the videos posted in the page and (ii) the high-intent score for the page.

17. The non-transitory computer-readable storage medium of claim 16, wherein the video ecosystem quality score for the video is determined based on a combination of the video quality panel score, the high-intent score, and one or more additional sub-scores.

18. The non-transitory computer-readable storage medium of claim 17, wherein the set of features associated with the video include at least one of: a retention score, a length of the video, a video quality metric, or a reshare metric.

19. The non-transitory computer-readable storage medium of claim 17, wherein the set of features associated with the video include a reaction metric for the video, wherein the reaction metric is determined based on a fraction of users that selected an option to react to the video.

20. The non-transitory computer-readable storage medium of claim 17, wherein the high-intent score is determined based at least in part on a loyalty score that measures an amount of user loyalty toward the page.

* * * * *